July 22, 1930. J. A. POMMER 1,771,271
TOOTH DISPLAY
Filed July 2, 1928

Inventor
John. A Pommer
By Bradbury + Cadwell
Attorney

Patented July 22, 1930

1,771,271

UNITED STATES PATENT OFFICE

JOHN A. POMMER, OF MINNEAPOLIS, MINNESOTA, ASSIGNOR TO HENRY P. BOOS, OF MINNEAPOLIS, MINNESOTA

TOOTH DISPLAY

Application filed July 2, 1928. Serial No. 289,889.

My invention relates to displays for teeth models and similar devices and has for its object to provide a display in which teeth models, dummy teeth and actual specimens of teeth may be conveniently displayed for the purpose of comparison and study.

Another object of the invention resides in constructing said display with a base having a boss issuing upwardly therefrom and formed with a central longitudinal opening to receive the stem of the tooth model or the root of the tooth to be displayed.

A still further object of the invention resides in constructing said boss of a resilient material such as rubber or the like so as to firmly grip upon the object displayed and so as to accommodate varies sizes of stems or roots.

With the foregoing and other objects in view, which will appear in the following description, the invention resides in the novel combination and arrangement of parts and in the details of construction hereinafter described and claimed.

In the practice of dentistry it becomes frequently necessary to study and compare tooth models and dummy teeth with actual specimens of teeth for the purpose of selection of dummy teeth for the dentures with which they are to be used. In the handling of such teeth and teeth models considerable inconvenience is encountered due to the fact that the same easily roll about and become intermingled and are more or less difficult to pick up and handle. At the same time when holding such tooth models in the fingers, a greater portion of the tooth becomes concealed from view than would be desirable. My invention overcomes these difficulties by providing a simple mounting in which the tooth or model is disposed in an upright position so as to be clearly visible to the user. At the same time the tooth or model when mounted in my display remains stationary so that the user need not continuously reclassify the teeth and models and check the same every time said teeth or models are picked up.

Figure 1:
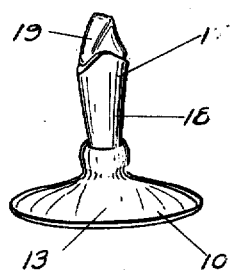
Fig. 1 is a perspective view of a tooth display having a tooth model mounted therein and illustrating an embodiment of my invention.
Figure 4:
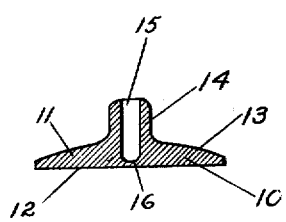
Fig. 4 is a sectional view similar to Fig. 3 with the tooth model removed.

The form of the invention shown in Figs. 1 and 4 is constructed with a base portion 10 of disk-like formation gradually increasing in thickness as indicated at 11 toward the center of the same. The lower surface of this base indicated at 12 is planiform while the upper surface 13 may be made smooth or provided with any desirable form of ornamentation. Coaxially disposed relative to the base 10 and issuing upwardly from the central portion of the same, I provide a boss 14 which may be of uniform diameter throughout its extent. This boss is constructed with a central cylindrical opening 15 extending longitudinally throughout the same and terminating within a short distance of the surface 12 of base 10 as indicated at 16. This boss forms a socket for the reception of the tooth model as will be presently described.

The entire display may be constructed of rubber or from other resilient material so that boss 14, may expand circumferentially for the purpose of receiving and holding the teeth models.

Figure 2:
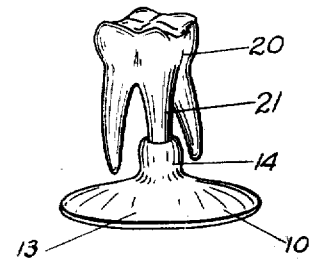
Fig. 2 is a view similar to Fig. 1 illustrating the display holding an actual tooth.
Figure 3:
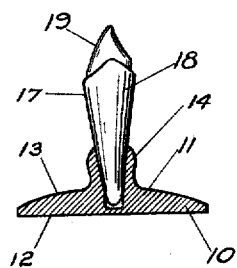
Fig. 3 is a longitudinal sectional view of the structure shown in Fig. 1.
Figure 5:
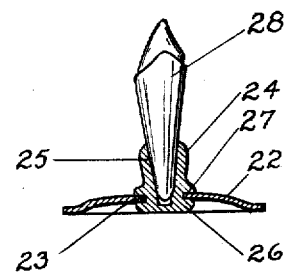
Fig. 5 is a sectional view similar to Fig. 3 illustrating a modification of the invention.

For the purpose of illustrating the method of using my invention, I have shown in Figs. 1, 3 and 5 a tooth model 17 of an incisor which comprises a tapered stem 18 supporting the portion of the tooth 19 normally protruding above the gums. In the use of the device this tooth model is grasped by the thumb and forefinger and the stem 18 forced into the opening 15 of boss 14. Said boss being constructed of resilient material stretches circumferentially to take the form shown in Figs. 1 and 3, thereby tightly gripping upon the stem of the tooth model and firmly holding the same mounted in the display. When the tooth has been so mounted the base 10 may be placed upon a horizontal surface in which case the tooth model remains in an upright position. The entire model can be readily picked up by the boss 14 and held by said boss or by the base 10, as desired, while the tooth or tooth model is being inspected. Where it is desired to compare or display actual teeth the same may be readily accomplished as shown in Fig. 2. In this instance a molar 20 is shown mounted in the display. In such case one of the roots 21 is inserted into the boss 14 in a manner similar to the application of the stem of a tooth model to said boss.

In Fig. 1, I have shown a modification of the invention. In this form I employ a circular base 22 which may be constructed out of sheet metal stamped to the desired form or which may be constructed of bone, ivory or any other suitable composition. This base member is formed with a circular opening in the center thereof indicated at 23. This modification further comprises a boss 24 provided with a central opening 25 similar to the opening 15 of boss 14 and is formed at its lowermost portion with an enlargement 26. This enlargement has encircling it a circumferential groove 27 which is adapted to receive the edge of the base 22 adjacent the opening 23 therein. The boss 24 is constructed of resilient material and the enlargement 26 thereof is readily forced into the opening 23. When the base 22 and the boss 24 have been assembled the device functions in a manner to hold a tooth model 28 similar to the other form of the invention.

My invention is highly advantageous in that a simple and effective device is provided whereby tooth models, dummy teeth and actual teeth may be readily mounted and displayed for any desired purpose. Due to the shape of the base and the relative proportions of the boss, the tooth model is supported in such a manner as not to be readily overturned. Due to the expansible boss or socket in which the tooth model is mounted, the stem of the same is firmly gripped so as to hold the model rigidly mounted. At the same time tooth models having different sized stems or tapered stems may be readily mounted.

Changes in the specific form of my invention, as herein disclosed, may be made within the scope of what is claimed without departing from the spirit of my invention.

Having described my invention, what I claim as new and desire to protect by Letters Patent is:

A tooth display comprising a base substantially inextensible in the plane thereof, and an expansible socket issuing upwardly therefrom, said socket having an opening therein for the reception of a tooth model, said opening extending below the upper surface of said base, said base restraining the expansion of said socket at the lower end of said opening.

In testimony whereof I have affixed my signature to this specification.

JOHN A. POMMER.